United States Patent [19]

Iwasawa

[11] 4,344,167
[45] Aug. 10, 1982

[54] PICKUP DEVICE

[76] Inventor: Tadashi Iwasawa, 5-26-8, Himonya, Meguro-ku, Tokyo, Japan

[21] Appl. No.: 124,633

[22] Filed: Feb. 25, 1980

Related U.S. Application Data

[63] Continuation of Ser. No. 965,893, Dec. 4, 1978, abandoned.

[51] Int. Cl.³ .............................................. G11B 21/16
[52] U.S. Cl. ................................................... 369/247
[58] Field of Search ............................... 369/247, 256

[56] References Cited

U.S. PATENT DOCUMENTS

| 2,177,692 | 10/1939 | DiToro | 369/247 |
| 2,509,356 | 5/1950 | Kilgour | 369/247 X |
| 2,510,342 | 6/1950 | Kilgore | 369/256 X |
| 2,819,087 | 1/1958 | Cerone | 369/247 X |
| 3,001,031 | 9/1961 | Jacque | 369/256 X |
| 4,063,285 | 12/1977 | Nagaoka | 369/247 X |
| 4,113,265 | 9/1978 | Iyeta | 369/247 |

OTHER PUBLICATIONS

Radio Gijutsu

Primary Examiner—Charles E. Phillips
Attorney, Agent, or Firm—Frishauf, Holtz, Goodman and Woodward

[57] ABSTRACT

A pickup device having an improved high fidelity in sound reproduction is provided. The pickup device comprises a vibration-absorbing member which is attached closely to a part of the head shell base plate member to absorb harmful vibrations generated through the head shell in the cartridge.

7 Claims, 2 Drawing Figures

PICKUP DEVICE

This is a continuation of application Ser. No. 965,893, filed Dec. 4, 1978, now abandoned.

This invention relates to an improved pickup device pounding high fidelity sound reproduction.

A pickup device for a record player comprises a head shell mounted at the end of the tone arm and a pickup cartridge which is fixed to the head shell. The pickup device reproduces sound from the audio signals which are recorded in a record. While the reproducing needle mounted on the cartridge vibrates in response to the audio signals when it follows the recorded disk tracks, the cartridge itself vibrates as well as a reaction to the vibration of the needle. As a result of addition of harmful signals caused by these undesired vibrations to the original ones, the quality of the reproduced sound is lowered.

Thus, it has been proposed to use a very hard material having high rigidity for the purpose of preventing the mechanical vibrations without giving large total weight to the device. For example, a head shell for which is used sintered alumina ceramics has been proposed in order to strengthen the structure supporting a vibrating body to prevent mechanical vibration of the supporting structure as much as possible. But, this prior attempt left a little to be desired in the separation of sounds and a stereo feeling, though it was quite effective in the production of sounds in the medium and low frequency ranges.

As a result of the investigation by the present inventors on the causes of the phenomenum, it may be considered that, since the crystals of these very hard oxide ceramics, nitride ceramics or carbide ceramics show, as seen from Table 1, not less than twice the velocity of sound propagated in ordinarily used metal materials such as aluminium, magnesium alloy, brass, stainless steel, etc., and the sound loss inside and on the surface of the ceramics is very low, vibrations generated in the cartridge are reflected again when they are propagated to overlap the original vibrations and thus cause the loss of aforementioned clarity of sounds and a stereo feeling. It has also been revealed that these phenomena occur not only in the case of the aforementioned materials having large propagation velocity of sound but also in the case when the head shell is composed of such metals as aluminium, magnesium alloy, brass and stainless steel and that the reflection of sound wave vibrations in the head shell affects the reproduced sounds very badly.

This invention has been brought about according to these findings.

SUMMARY OF THE INVENTION

The object of this invention is to provide a pickup device having extremely high fidelity by attaching a vibration-absorbing material closely to a part of the head shell, the position of the attachment being different from the position on which the cartridge is mounted, to absorb effectively harmful vibrations which are generated in the cartridge through the head shell.

TABLE 1

| Material | Density (g/cm$^3$) | Sound velocity (Km/s) Longitudinal wave | Sound velocity (Km/s) Transverse wave | Coefficient of linear expansion ($\times 10^{-6}$/°C.) |
| --- | --- | --- | --- | --- |
| Aluminium | 2.69 | 6.420 | 3.040 | 23 |
| Titanium | 4.58 | 5.990 | 2.960 | 9.4 |
| Iron | 7.86 | 5.950 | 3.240 | 12 |
| Copper | 8.96 | 5.010 | 3.270 | 16.7 |
| Magnesium | 1.74 | 5.770 | 3.050 | 25 |
| Brass | 8.6 | 4.700 | 2.100 | 13 |
| Stainless steel | 7.91 | 5.790 | 3.100 | 16.4 |
| Silicon nitride | 3.27 | 11.000 | 6.200 | 2.5 |
| Sintered alumina | 3.96 | 10.300 | 6.345 | 8 |
| Sapphire | 3.981 | 11.000 | 6.400 | 5.8 |
| Silicon carbide | 3.15 | 12.300 | 7.190 | 4.4 |
| Boron carbide | 2.52 | 13.200 | 7.700 | 5.8 |

DETAILED DESCRIPTION

Figure 1:
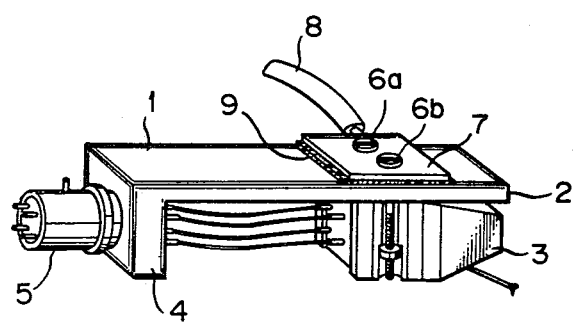
FIG. 1 shows a perspective view of one embodiment of this invention.

Referring to FIG. 1, the pickup device comprises a rectangular head shell base plate member (1) which is made of a very hard nitride ceramic material which contains such materials as silicon nitride as a main component; a pickup catridge (3) which is fixed closely to the mounting surface (2); the terminal-fixing member (4) which extends on one end of said base plate member (1) perpendicular thereto; and the terminal connector (5) which is rigidly fixed thereto. The said cartridge (3) and the fixing plate member (7) having in one united body a finger knob (8) extended sideways are fixed firmly together by means of a pair of screws (6a) and (6b). The vibration absorbing member (9) is fixed closely between the said fixing plate member (7) of the finger knob (8) and the surface of the said head shell base plate member.

Harmful vibrations are absorbed effectively by the absorbing member (9) which is located nearby when the vibrations of the cartridge (3) are propagated along the surface of or into the interior of the head shell.

Accordingly, the aforementioned defects in the reproductions of a sound of high or medium frequency sound range are completely removed.

Figure 2:
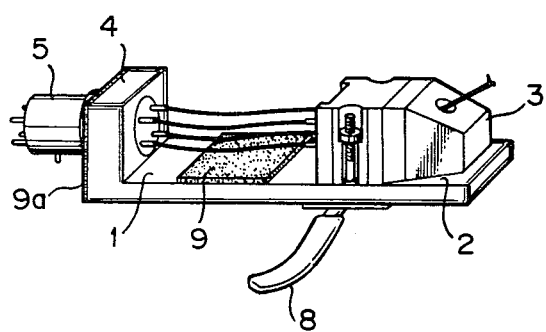
FIG. 2 shows a perspective view of another embodiment of this invention.

Referring to FIG. 2, the cartridge (3) is fixed to the mounting surface (2) of the head shell base plate member (1) which is composed of the ceramics according to the present invention.

The aforementioned laminar vibration-absorbing member (9) may be stuck on a part of said mounting surface (2) or the same absorbing member (9a) may be stuck effectively on the end surface of the terminal-fixing member (4).

As the vibration absorbing member (9) which is used for the aforementioned pickup device, there may be mentioned, for example, a hardened composition composed mainly of polydiorganosiloxane having an average molecular weight of not less than 15,000 and inorganic fine powders, the hardness of which may preferably range from about 8 to 30 to give good properties.

It is desirable that the thickness, volume and hardness of said absorbing member (9) should be adjusted to their optimum conditions because they have an extremely important relationship to the properties of sound absorption. The absorbing member (9) according to this invention shows extremely good adhesion to the surface of the head shell which is made to be sufficiently smooth and gives the best results as compared with other rubber absorbing materials. Besides, the properties of the vibration absorption remain almost unchanged irrespective of wide changes of room temperature.

As described hereinbefore, unnecessary undesired vibrations which are generated in the head shell are effectively absorbed and removed according to the present invention and the cartridge detects the signals recorded in disk tracks with such a high fidelity that excellent characteristics of reproduced sounds are obtained.

While this effect may also be obtained effectively in cases where the head shell is composed of metal materials such as aluminium etc., the effect is enhanced synergistically in cases where such very hard ceramics as shown in the Example are used.

I claim:

1. In a pickup device comprising a head shell having a head shell base member (1) made of single crystals or polycrystalline materials containing very hard ceramics as a main component thereof, a pickup cartridge (3) fixed directedly to a surface portion of the head shell base plate member (1), and a vibration-absorbing member (9);

the improvement wherein:

said vibration-absorbing member (9) is in the shape of a thin plate and is firmly attached directly to a part of the surface of said head shell base plate member (1) different from the surface portion of said head shell base plate member to which said pickup cartridge (3) is fixed, to absorb harmful vibrations generated in the pickup cartridge (3) through the head shell;

said vibration-absorbing member (9) is composed mainly of polydiorganosiloxane and inorganic fine powders, said polydiorganosiloxane having an average molecular weight of not less than 15,000; and the hardness of said vibration-absorbing member (9) is within the range of from about 8 to about 30.

2. In the pickup device of claim 1, the further improvement wherein the pickup device comprises a fixing plate member (7) having a finger knob (8) extending therefrom, and wherein said vibration-absorbing member (9) is fixed by said fixing plate member (7) to a surface of said head shell base plate member (1), which is opposite the surface on which said cartridge (3) is fixed.

3. In the pickup device of claim 2, the further improvement wherein said vibration-absorbing member (9) and said cartridge (3) oppose each other on opposite surfaces of said head shell base plate member (1).

4. In the pickup device of claim 3, the further improvement comprising common connecting means (6a,6b) connecting said vibration-absorbing member (9) and said cartridge (3) to said head shell base plate member (1).

5. In the pickup device of claim 1 wherein said vibration-absorbing member (9) is fixed to an opposite surface of said head shell base plate member (1) from the surface to which said cartridge (3) is fixed.

6. In the pickup device of claim 1 wherein said vibration-absorbing member (9) is fixed to the same side of the surface of said head shell base plate member (1) as said cartridge (3).

7. In the pickup device of claim 1, the improvement wherein said head shell base plate member (1) is made of a very hard nitride ceramic material which contains silicon nitride as a main component.

* * * * *